US012389913B2

(12) United States Patent
Hellmund et al.

(10) Patent No.: US 12,389,913 B2
(45) Date of Patent: Aug. 19, 2025

(54) LIQUID-CORE CAPSULES FOR PEST CONTROL

(71) Applicant: Katz Biotech AG, Baruth/Mark (DE)

(72) Inventors: Markus Hellmund, Berlin (DE); Joerg Rademacher, Berlin (DE); Andrea Haeussler, Potsdam (DE)

(73) Assignee: Katz Biotech AG, Baruth/Mark (DE)

( * ) Notice: Subject to any disclaimer, the term of this patent is extended or adjusted under 35 U.S.C. 154(b) by 433 days.

(21) Appl. No.: 17/789,913

(22) PCT Filed: Mar. 5, 2021

(86) PCT No.: PCT/DE2021/100226
§ 371 (c)(1),
(2) Date: Jun. 29, 2022

(87) PCT Pub. No.: WO2021/180272
PCT Pub. Date: Sep. 16, 2021

(65) Prior Publication Data
US 2023/0051818 A1   Feb. 16, 2023

(30) Foreign Application Priority Data
Mar. 10, 2020   (DE) ............... 10 2020 106 533.7

(51) Int. Cl.
*A01N 63/12*   (2020.01)
*A01N 25/10*   (2006.01)
*A01P 7/04*    (2006.01)

(52) U.S. Cl.
CPC .............. *A01N 63/12* (2020.01); *A01N 25/10* (2013.01); *A01P 7/04* (2021.08)

(58) Field of Classification Search
CPC ........ A01N 63/12; A01N 25/26; A01N 25/28; A01N 25/10
See application file for complete search history.

(56) References Cited

U.S. PATENT DOCUMENTS

| 4,615,883 A | 10/1986 | Nelsen et al. | |
|---|---|---|---|
| 4,701,326 A | 10/1987 | Nelsen et al. | |
| 4,753,799 A | 6/1988 | Nelsen et al. | |
| 5,401,506 A | 3/1995 | Chang et al. | |
| 11,140,897 B2 | 10/2021 | Rademacher et al. | |
| 2018/0070586 A1* | 3/2018 | Kim | A01N 25/34 |
| 2021/0204542 A1* | 7/2021 | Rademacher | A01N 25/002 |

FOREIGN PATENT DOCUMENTS

| CN | 108142415 A * | 6/2018 | ............ A01N 25/26 |
|---|---|---|---|
| DE | 10 2015 016 114 A1 | 6/2017 | |
| WO | 03/059503 A1 | 7/2003 | |
| WO | 2016/176764 A1 | 11/2016 | |
| WO | 2017/097282 A1 | 6/2017 | |

OTHER PUBLICATIONS

Machine translation of CN 108142415 (Jun. 12, 2018).*
Patel et al. "Entrapment of Biological Control Agents Applied to Entomopathogenic Nematodes", Biotechnology Techniques, Chapman & Hall, vol. 8, No. 8, Aug. 1, 1994 (Aug. 1, 1994), pp. 569-574.
Hiltpold et al. "Capsules containing entomopathogenic nematodes as a Trojan horse approach to control the western corn rootworm", Plant and Soil; an International Journal On Plant-Soil Relationships, Kluwer Academic Publishers, DO, vol. 358, No. 1-2, May 5, 2012 (May 5, 2012), pp. 11-25.
Kim et al. "Enhanced alginate capsule properties as a formulation of entomopathogenic nematodes", Biocontrol, Kluwer Academic Publishers, Dordrecht, NL, vol. 60, No. 4, Nov. 29, 2014 (Nov. 29, 2014), pp. 527-535.
Aquino-Bolanos et al. "Survival of entomopathogenic nematodes in oil emulsions and control effectiveness on adult engorged ticks (*Acari: ixodida*)", Journal of Nematology., US, vol. 51, Mar. 29, 2019 (Mar. 29, 2019), pp. 1-10, Retrieved from the Internet: https://www.ncbi.nlm.nih.gov/pmc/articles/PMC69296.
Cruz-Martinez et al., Article "Formulation of Entomopathogenic Nematodes for Crop Pest Control: a Review", Plant Protect. Sci. (2017), 10 pages.
Aquino-Bolanos et al.; Title: Survival and Effectiveness of Entomopathogenic Nematodes in Oil Emulstions against Scyphophorus acupuncatatus Gyllenhal in a laboratory, Southwestern entomologist vol. 44, No. 1, Mar. 2019, 9 pages.
Kaya and Nelsen, Article "Encapsulation of Steinernematid and Heterorhabditid Nematodes with Calcium Alginate: A New Approach for Insect Control and Other Applications", Environ. Entomol. 14: 572-574 (1985), 3 pages.
Kaya et al, Article "Escape of Steinernema feltiae from Alginate Capsules Containing Tomato Seeds", Journal of Nematology 19(3): 287-291 (1987), 5 pages.
Kim et al, Article "An Edible Alginate Microcapsulation of Entomopathogenic Nematode, Steinernema carpocapsae", Korean J. Appl. Entomol. 42(2): 145-152 (2003)—with English abstract, 8 pages.
Navon et al., Article "An Edible-to-insects Calcium Alginate Gel as a Carrier for Entomopathogenic Nematodes" (2010), downloaded on Dec. 17, 2012, 11 pages.
Renn, Article "Mortality of Immature Houseflies (*Musca domestica* L.) in Artificial Diet and Chicken Manure after Exposure to Encapsulated Entomopathogenic Nematodes (Rhabditida: Steinernematidae, Heterorhabditidae)" (1995), downloaded Nov. 30, 2014, 14 pages.
Georgis and Kaya, Chapter 9 "Formulation of Entomopathogenic Nematodes" (Chapter in book: Formulation of Microbial Biopesticides, Kluwer Academic Publishers (1998), pp. 289-308, 20 pages.
German Search Report in DE 10 2020 106 533.7, dated Jan. 14, 2021, with English translation of relevant parts.

(Continued)

*Primary Examiner* — John Pak
(74) *Attorney, Agent, or Firm* — Collard and Roe, P.C.

(57) ABSTRACT

Liquid core capsules are provided for pest control, wherein the liquid-core capsules have a liquid core comprising entomopathogenic nematodes and a surrounding hydrogel shell. The liquid core comprising the nematodes is formed on the basis of an emulsion comprising at least an oil and an aqueous liquid.

15 Claims, 7 Drawing Sheets

(56) References Cited

OTHER PUBLICATIONS

Figure 1:
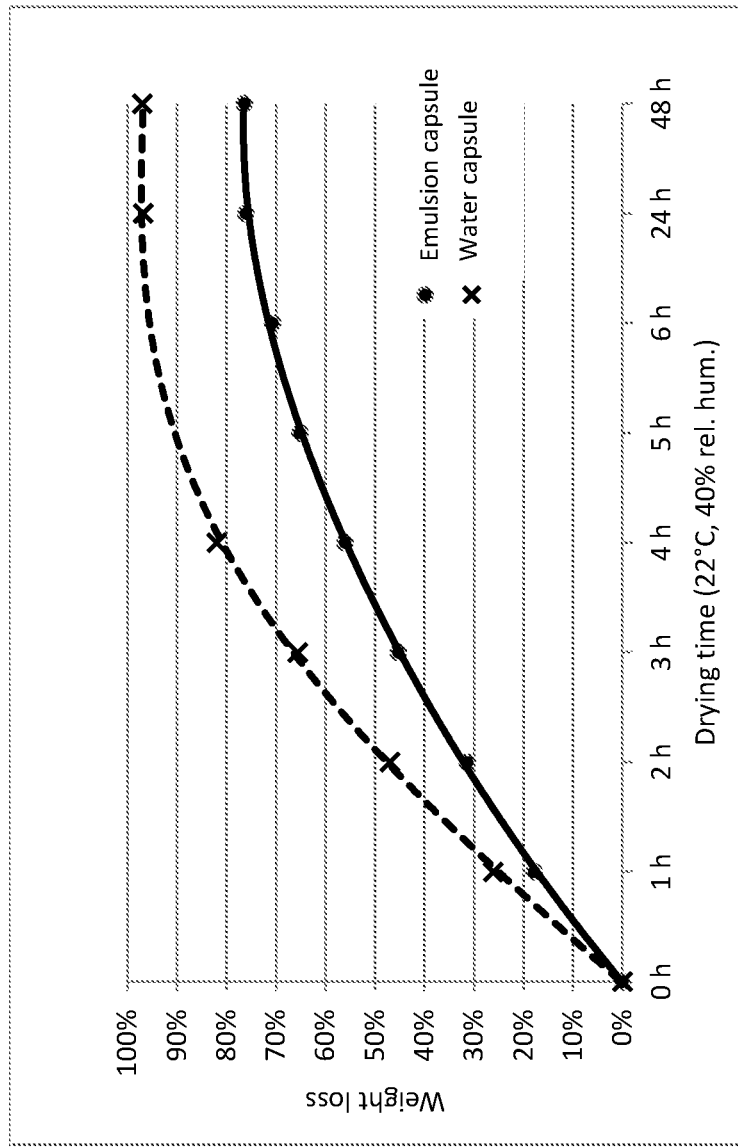

International Search Report in PCT/DE2021/100226, dated May 31, 2021.

H. Cheng et al., A peppermint oil emulsion stabilized by resveratrol-zein-pectin complex particles: Enhancing the chamical stability and antiicrobial activity in combination with the synergistic effect, Food Hydrocolloids, vol. 103 (2020), 105675 (13 pages).

Wikipedia: "Types of plant oils" (2020), downloaded on Jul. 10, 2022 (2 pages).

* cited by examiner

LIQUID-CORE CAPSULES FOR PEST CONTROL

CROSS REFERENCE TO RELATED APPLICATIONS

This application is the National Stage of PCT/DE2021/100226 filed on Mar. 5, 2021, which claims priority under 35 U.S.C. § 119 of German Application No. 10 2020 106 533.7 filed on Mar. 10, 2020, the disclosure of which is incorporated by reference. The international application under PCT article 21 (2) was not published in English.

The present invention relates to liquid-core capsules for pest control, wherein the liquid-core capsules have a liquid core comprising entomopathogenic nematodes and a surrounding hydrogel shell. Furthermore, the invention relates to a method for producing such liquid-core capsules and a method for controlling pests, in which said liquid-core capsules are applied to a plant stock.

Nematodes (threadworms) are filamentous soil biota that have a length of 0.5 mm, for example. They are among the most species-rich multicellular creatures on earth and occur naturally in all imaginable habitats. Entomopathogenic (entomon—Greek for insect) nematodes (EPN) are those nematodes that act as natural enemies of insects and in this case usually use the insects as host organisms or generally damage said insects. In terms of biological pest control, the term entomopathogenic nematodes also includes parasitic nematodes of snails, since these are comparable to insect-pathogenic nematodes in terms of their biology, reproduction, application and effect. The term entomopathogenic nematodes should therefore be broadened to include not only nematodes that damage insects. In addition to the snail-damaging nematodes, this can also mean, for example, predatory nematodes which actively hunt their prey, for example, other nematodes, and which are also used in biological pest control, for example, for combating root-damaging nematodes.

Certain nematodes are often highly specialized on certain insects or snails, so that they only infest the respective species and are therefore harmless to humans, warm-blooded animals and plants. This property makes the entomopathogenic nematodes particularly suitable for biological pest control.

In biological crop protection, nematodes are now among the most important opponents of insects and snails that live in or on the plant substrate (for example, peat, compost, minerals, plastics). In this context, the larval stages of many beetles (grubs) or flies (maggots) play a particularly important role, since said larval stages can cause considerable damage to the root region of the plant. Insects and snails that cause damage above ground can also be controlled with the help of nematodes, for example, if the animals go into the ground to pupate or lay eggs, move on the ground or are accessible to the nematodes in another way. As a rule, the entomopathogenic nematodes actively seek out their respective host organisms and invade said organisms, so that the infected animals (for example, larvae) usually die within two to three days. The nematodes then multiply in the carcasses and then infest other living larvae or the respective host organisms. This process continues until no more living host organisms are found by the nematodes.

Entomopathogenic nematodes are already being used In biological pest control, for example, to control the grubs of garden leaf beetles, June beetles, vine weevils and corn rootworms, and to control the maggots of the meadow crane fly and the fungus gnat, and to control the caterpillars of the oak processionary moth, the codling moth and the deltoid moths and night moths and to control thrips larvae and pupae and to control field snails and path snails (slugs). The areas of application are in the care of lawns and public greenery, in tree nurseries, in fruit growing, in the cultivation of vegetables, herbs and ornamental plants and in maize cultivation. The nematode species *Heterorhabditis bacteriophora, Heterorhabditis downesi, Steinernema feltiae, Steinernema carpocapsae, Steinernema kraussei* and *Phasmarhabditis hermaphrodita* are used in particular for these purposes.

The commercial mass production of entomopathogenic nematodes (EPN) is usually carried out by means of microbiological processes in liquid culture bioreactors (fermenters). After propagation, the nematodes are usually introduced into a clay mineral powder, for example, about 7,500,000 animals/g. Said clay mineral powder serves as a carrier material that can be portioned in bags. It is expedient to store the product in a cool place at between about 4° C. and 10° C. until it is used. According to current recommendations, the preferred application rate for the overwhelming number of pests that can reside in the plant substrate is around 500,000 EPN/m$^2$.

In a conventional application, the product, that is, the mixture of EPN and clay material powder, is dispersed in water and applied to the area to be treated by watering or spraying. The amount of water required is between 100 and 5,000 ml/m$^2$, for example, depending on the application method, the environmental conditions and the culture to be treated. The dispersion should be regularly stirred or shaken during application to prevent the nematodes from sinking into the dispersion. However, in this case, strong shearing forces should be avoided in order to not damage the nematodes. After treatment, the plant substrate must be kept sufficiently moist during the control period, since otherwise the nematodes can dry out quickly. In addition, the nematodes cannot move on dry surfaces, making it difficult to find the hosts. However, effects such as the nematodes being flushed out of the soil substrate, for example, during watering, can lead to the effect of the nematodes being further reduced.

Generally, treatment with entomopathogenic nematodes is carried out at the time of the first appearance of the pest stages to be controlled. If no pests are present, the entomopathogenic nematodes can usually only survive in the substrate for a few days. Overall, successful treatment with entomopathogenic nematodes requires the right time of treatment, an effective application method and sufficient moisture in the plant substrate during the entire control period. Usually, the treatment must be repeated at regular intervals.

There are already attempts to introduce entomopathogenic nematodes into a plant stock in other administration forms. For example, U.S. Pat. No. 4,753,799 describes an alginate-based encapsulation for nematodes. The capsules can be coated to reduce water loss. WO 2016/176764 A1 also has alginate capsules with nematodes as the subject. The alginate capsules are coated with cellulose and dried. This enables long-term storage over several months. The problem with such encapsulated nematodes, however, is that the effect of the released capsules in pest control is always relatively short. WO 2016/176764 A1 describes the capsules being broken down within one day to one week. Also, the release experiments referred to in U.S. Pat. No. 4,753,799 are only carried out for a period of 24 to 48 hours. At least currently there is no product on the market with particle-like encapsulated nematodes.

In view of this, the object of the invention is to improve the encapsulation of nematodes such that the application of the nematode capsules achieves a significantly prolonged effect in pest control.

This object is solved by liquid-core capsules with entomopathogenic nematodes, as they result from claim 1. Preferred embodiments of said liquid-core capsules are the subject matter of the dependent claims. Furthermore, this object is solved by a method for producing such liquid-core capsules and by a method for controlling pests, as it derives from the other independent claims and the claims dependent thereon.

The proposed liquid-core capsules for pest control have a liquid core comprising entomopathogenic nematodes and a surrounding hydrogel shell. An important point of the invention is that the liquid core is formed on the basis of an emulsion containing at least an oil and an aqueous liquid. Surprisingly, the inventors were able to show that, due to the emulsion in the core of the capsules, the entomopathogenic nematodes are much more vital and active for a longer period of time compared to conventional nematode products. This makes it possible for the nematodes to be released from the liquid-core capsules after they have been applied to a plant stock over a considerably longer period of time than is possible with conventional nematode products. For example, the liquid-core capsules according to the invention allow the nematodes to be released over a period of more than four weeks. This extends the period of effect accordingly. The need for further follow-up treatments with renewed application of the capsules during the culture period is significantly reduced or it may even be possible to dispense with follow-up treatments at all. The emulsion in the core also has the particular advantage that the nematodes in the capsules are better protected from drying out and can therefore better survive dry phases in the plant substrate. This results in increased effectiveness when using the liquid-core capsules according to the invention.

In general, the use of encapsulated nematodes has the particular advantage that the capsules can be dosed more precisely, especially on small areas and in individual pots, than with a conventional watering application, for example. This avoids underdosing and overdosing, which increases the effectiveness on the one hand. On the other hand, avoiding overdosing results in further cost advantages. Also in comparison with, for example, a conventional watering application of nematodes, the nematodes in the liquid-core capsules are better protected against shearing forces. There are also no changes in concentration due to sinking of the nematodes in the formulation. Furthermore, the amount of water used when applying the liquid-core capsules is significantly lower than, for example, in a watering application. Furthermore, due to the encapsulation, the water or the liquid phase remains in the immediate vicinity of the nematodes and is not distributed in the soil, as is the case with a watering application, for example. As a result, the nematodes are better protected from drying out.

The oil content in the liquid-core capsules or the use of an emulsion in the liquid core of the capsules according to the invention has the further decisive advantage that this significantly stabilizes the shape of the capsules during production. Compared to capsules containing no oil content in the core, they have a much more even, rounder shape. Because of the reduced volume loss due to water evaporation associated with the emulsion, the capsules also remain dimensionally stable over the long term. On the one hand, this is an advantage when using the liquid-core capsules in crop protection, but also when storing the liquid-core capsules before use. The inventors found that the capsules remain dimensionally stable for months when stored in a cool place in closed and preferably ventilated containers. The liquid-core capsules according to the invention can even be stored in such containers at room temperature for long periods without increased loss of water. Storage at room temperature should preferably take place with especially good ventilation. It can be useful to moisten the surface of the capsules with water for storage over a period of several months. A particularly long storage is possible with cooling, for example, between 4° C. and 10° C. The oxygen requirement of the nematodes is reduced under these conditions, so that the vitality of the nematodes can be maintained over a very long period. The cooling also has the advantage that the growth of disruptive microorganisms, for example, mold, is significantly slowed down.

The liquid-core capsules according to the invention can be used directly without further modifications, for example, in agriculture or in horticulture, and can be applied to the plant stock, for example, using mechanical means. The particularly stable shape of the liquid-core capsules according to the invention already offers advantages when the product is applied mechanically, since the machinability is very good because of the good stability and the resulting standardization of the product, for example, when applying with spreaders. As a result of the surprisingly positive effect of the emulsion in the core of the capsules on the vitality of the nematodes, the nematodes remain approximately equally active for several weeks after the liquid-core capsules have been applied to a plant stock, wherein the nematodes continuously emerge from the liquid-core capsules. The effect of the nematodes on the pests is maintained over a long period of time, for example, up to four weeks, as a result of this delayed release. On the one hand, the emulsion contributes to this long-term effect of the liquid-core capsules in use, since this reduces water evaporation. On the other hand, the hydrogel shell offers additional protection against drying out, whereby, depending on the application, the protection of the hydrogel shell against drying out can be increased by further measures, for example, by increasing the wall thickness or by using additives in the shell.

Experiments by the inventors were able to show that using an emulsion in the core of the liquid-core capsules according to the invention significantly reduces the drying out of the nematodes in the capsule compared to a liquid-core capsule containing only water in the core (without emulsion). While a liquid-core capsule having an aqueous core dries out completely within a few hours, a liquid-core capsule according to the invention having a core on the basis of an emulsion remains dimensionally stable for several days, in each case in an open system at room temperature. Even after drying phases, which result in an almost complete loss of water from the capsule, a film of water remains in the immediate vicinity of the nematodes. Comparable to a water-in-oil emulsion, the oil forms a diffusion barrier for the water. Added emulsifiers, for example, E405, stabilize this condition. A certain minimum proportion of water in the core during the production of the liquid-core capsules, in particular at least 30%, is particularly advantageous since, on the one hand, this ensures a surrounding water film that is necessary for the survival of the nematodes and, on the other hand, it is very expedient for the formation of the hydrogel shell for process technology reasons. Overall, therefore, the liquid-core capsule according to the invention containing the core based on an emulsion offers the nematodes in the core enough moisture to survive, so that the nematodes can emerge from the liquid-core capsules over a long period of time during use.

The oil as a component of the emulsion is preferably a vegetable oil, for example, sunflower seed oil and/or rapeseed oil and/or olive oil. Combinations of different oils are also possible. In principle, for example, the use of scented oils as a component of the emulsion is also possible. In general, oils that are liquid at temperatures above about 0° C. can preferably be used. Even if the liquid-core capsules are generally used in plant protection at higher temperatures, the use of oils that are still liquid at lower temperatures is advantageous for the vitality of the nematodes, in particular with regard to the storage of the liquid-core capsules at low temperatures, for example, at refrigerator temperatures (4-10° C.). Oils which are preferably still liquid at temperatures down to −15° C. or down to −20° C. are preferably used.

Preferably, the proportion of oil in the emulsion is at least 10%. Preferably the maximum proportion of oil in the emulsion is 70% (w/w). For example, the proportion of oil in the emulsion can be 10% or 15% or 20% or 30% or 40% or 50% or 60% or 70% (in each case w/w). In the production of the liquid-core capsules, a suspension of the nematodes or the nematode product in water is preferably mixed with the emulsion to provide the mixture for the core. As a result, the proportion of oil in the core of the liquid-core capsules is generally slightly reduced. However, the proportion of oil in the liquid core should preferably not be less than 15%. For example, the proportion of oil in the core can be in a range between 19 and 68%, in particular between 19.4 and 67.9%.

The aqueous component (aqueous liquid) of the emulsion can in particular be water, for example, tap water, or treated water, for example, deionized water. In principle, isotonic salt solutions that correspond to the physiological osmolarity of the nematodes are further suitable. In preferred embodiments, the water for the emulsion can be enriched with oxygen. This can have a further beneficial effect on the vitality of the nematodes.

The surrounding hydrogel shell is preferably an alginate shell, for example, a calcium alginate shell. An alginate shell is particularly suitable for the liquid-core capsules according to the invention, since, on the one hand, the production of such liquid-core capsules can be implemented very well in terms of process technology. On the other hand, the components of the alginate shell are very easily biodegradable after they have been applied to a plant substrate and do not leave behind any problematic residues.

In particularly preferred embodiments, the liquid-core capsules according to the invention comprise a capsule shell made from an alginate-based hydrogel, wherein water, vegetable oil and the nematodes are located in the liquid capsule core. Salts and one or more emulsifiers can be provided as auxiliaries. Preferably only food grade substances are used for the capsules so that the capsules are fully biodegradable.

In preferred embodiments, the hydrogel shell can contain at least one additive. The properties of the hydrogel shell can be adapted to different applications by means of one or more additives, for example, further protection against evaporation being able to be ensured in this way. Examples of suitable additives are cellulose-based compounds, preferably methyl cellulose. Other possible additives are thickeners such as xanthan and/or locust bean gum. Said thickeners can also be used to advantage in order to influence the properties of the hydrogel shell in a positive way.

The individual liquid-core capsules preferably comprise an average of about 1,000 to 15,000 nematodes per liquid-core capsule. About 1,500 to 7,500 nematodes per liquid-core capsule are particularly preferred, for example, 2,000 to 7,500 nematodes per liquid-core capsule. It can also be preferred that fewer nematodes are comprised per liquid-core capsule, for example, between 1,000 and 2,000 nematodes per liquid-core capsule. For example, if the nematodes are to be applied to plant pots, it may be advantageous to use more capsules, each with fewer nematodes, than just a few capsules, each with many nematodes. The background to this is that, for example, in the case of mechanical dispensing, the intended number of capsules to be dispensed may not be met exactly. The more nematodes are contained in the individual capsule and the fewer capsules that are to be applied for the intended dosage, the greater the dosage deviation if one capsule is applied too much or too little. Against this background, for example, a number of 1,500 to 2,000 nematodes, in particular approximately 1,600 nematodes, per liquid-core capsule can be particularly preferred. In general, an exact count and dosage of nematodes is difficult in practice, so that these specifications are subject to certain fluctuations and is to be understood, for example, as an average deviation of ±20%. The deviations can optionally also be higher.

The liquid-core capsules can have an average diameter of, for example, between 1 to 30 mm, preferably between 3 to 10 mm or between 5 to 10 mm. The larger the capsules, the more nematodes can generally be contained in the liquid-core capsules. As already explained in connection with the number of nematodes per liquid-core capsule, it can also be advantageous with regard to the size of the liquid-core capsules to make the capsules relatively small, so that possible dosage errors are minimized. Against this background, a particularly preferred size of the liquid-core capsules is a diameter of 3 to 6 mm or 4.5±1.5 mm. The size of the capsules can easily be controlled in the production process of the liquid-core capsules, as is explained in more detail below in connection with the production process for the liquid-core capsules.

The weight per liquid-core capsule is preferably on average between 10 to 100 mg, preferably between 20 to 80 mg, in particular between 40 to 80 mg. A weight in a range from 40 to 60 mg per liquid-core capsule is particularly preferred, particularly preferably about 50 mg per liquid-core capsule. These specifications relate to the wet weight. The weight of the liquid-core capsules can also be varied in the course of the production process of the liquid-core capsules and can thus be adapted to different types of application of the liquid-core capsules. With the size and weight, the number of nematodes per liquid-core capsule or the loading of the liquid-core capsules with nematodes can also be adapted to the specific application. For example, liquid-core capsules that are placed in individual plant pots, for example, by hand, can be made larger and contain more nematodes than liquid-core capsules that are mechanically distributed over a large area, for example, with a spreader. Larger liquid-core capsules are generally suitable for dosing one or a few capsules, for example, three capsules per plant pot. Smaller capsules may be preferred to larger capsules with a view to reducing dosing errors, particularly when the capsules are applied mechanically.

In a further preferred embodiment of the liquid-core capsules, the liquid-core capsules further contain at least one attractant for the pests to be controlled. An attractant ensures that the pests, that is, the target insects of the nematodes or possibly the snails, are attracted to the liquid-core capsules, so that the nematodes emerging from the liquid-core capsules can reach the insects or snails much more easily. For example, essential oils are suitable as attractants. Mint oil, which is very attractive to the larvae of the fungus gnat, has proven to be particularly beneficial. Very low concentrations of an attractant and in particular of an essential oil are usually sufficient. For example, 0.1 to 1 ml, preferably 0.3 ml, of mint oil can be added for the preparation of 1 kg of liquid-core capsules, which is generally sufficient for a particularly advantageous attractant effect on the fungus gnat larvae. The attractant and in particular the essential oil can be added, for example, during the production of the emulsion or as a component of the emulsion. The essential oil can be used as an additional oil in the emulsion for this purpose.

Various nematodes are suitable as entomopathogenic nematodes in the liquid-core capsules according to the invention. For example, the species *Steinernema carpocapsae* and/or *Steinernema feltiae* and/or *Steinernema kraussei* and/or *Heterorhabditis bacteriophora* and/or *Heterorhabditis downesi* and/or *Phasmarhabditis hermaphrodita* are particularly suitable. Said nematodes have already proven successful in biological pest control and can be used very effectively to control various pests. The following table summarizes the different areas of application and the pests found there, with regard to the nematode species suitable for controlling them.

| Area of application | Pest | Nematode species |
| --- | --- | --- |
| Lawn | Garden leaf beetles, June beetles, May beetles (grubs) Crane fly (maggot) | *Heterorhabditis bacteriophora* *Heterorhabditis downesi* |
| Public green | Oak processionary moth | *Steinernema feltiae* |
| Nurseries | Vine weevil, garden leaf beetle (grubs) | *Heterorhabditis bacteriophora* *Heterorhabditis downesi* *Steinernema kraussei* |
| Fruit growing | Codling moth (caterpillar) | *Steinernema feltiae* |
| Vegetable, herb and ornamental plant cultivation | Deltoid moths and night moths (caterpillar) Fungus gnat (maggot) Thrips (larva, pupa) | *Steinernema feltiae* *Steinernema carpocapsae* |
|  | Field snails and path snails (slugs) | *Phasmarhabditis hermaphrodita* |
| Maize cultivation | Corn rootworm (grub) | *Heterorhabditis bacteriophora* |

The liquid-core capsules according to the invention can, for example, be used with particular advantage for the encapsulation of *Steinernema feltiae,* which are used to combat fungus gnats and in particular the larvae of fungus gnats.

The invention further comprises a plant substrate that already contains the liquid-core capsules according to the invention. Such a plant substrate can be used with advantage, for example, for the potting and repotting of vegetable plants, herbs or ornamental plants, in which an emerging pest infestation is immediately controlled. This is particularly advantageous if the plants have had contact with pests before being potted or repotted. Liquid-core capsules containing a relatively high nematode density are particularly suitable for mixing the liquid-core capsules according to the invention into a plant substrate. For example, liquid-core capsules containing approximately 7,200 animals per liquid-core capsule can be used for this purpose. This corresponds to around 50 million EPN/kg capsules. For the production of the plant substrate, the different, per se customary components of the substrate (for example, white peat, black peat, water, carbonate of lime, fertilizer, wetting agent) can be mixed and proportionately mixed with, for example, approximately 100 g capsules per $m^3$ substrate.

The invention further comprises a method for producing liquid-core capsules according to the above description, wherein the liquid-core capsules to be produced have a liquid core comprising entomopathogenic nematodes and a surrounding hydrogel shell and the liquid core are formed on the basis of an emulsion comprising at least an oil and an aqueous liquid. For the production of said liquid-core capsules, the emulsion comprising the nematodes is dropped into a hydrocolloid solution in the presence of divalent ions. This method, known in principle as inverse microencapsulation, allows the production of liquid-core capsules comprising nematodes in the liquid core, the nematodes being characterized by a particularly long-term vitality and activity over several weeks during the use of said liquid-core capsules in pest control. This production process allows the capsule size and weight to be controlled and the nematode loading of the capsules to be adjusted so that the liquid-core capsules can be adapted to different applications.

Overall, the liquid-core capsules that can be produced using this process offer a continuous supply of nematodes in the plant substrate for biological pest control and thus effective protection of the plant stock for several weeks. Since the nematodes can continuously emerge from the liquid-core capsules over a longer period of time, the use of said liquid-core capsules has a long-term effect. The structure of the capsules and in particular the emulsion comprised in the liquid core leads to a delayed drying out of the nematodes, so that living and active nematodes can emerge from the capsules for weeks, thus being continuously released. In addition, the liquid-core capsules produced according to the invention offer good mechanical stability, which allows easy handling and good shelf life without mold growth. The method also offers the advantage that the capsules can be adapted to different requirements, in particular by adapting the hydrogel shell. For example, the wall thickness of the shell and its strength can be influenced by additives. The use of the liquid-core capsules in the plant stock allows a largely constant concentration of nematodes in the plant substrate because of the constant conditions for the nematodes due to the emulsion comprised in the liquid-core capsules and the long-term or delayed release of the nematodes, even with effects such as a washing out of the nematodes that have already left the soil substrate, for example, in ebb/flow systems in plant culture.

For the production of the liquid-core capsules the material for the shell is provided as a hydrocolloid solution. The liquid for the core is dropped into said hydrocolloid solution. The hydrocolloid solution preferably comprises alginate, in particular sodium alginate (E401) and optionally further additives. The liquid for the core preferably comprises divalent ions, in particular calcium ions, for example, in the form of calcium chloride or calcium lactate. Calcium chloride or calcium lactate can be added, for example, in a concentration of at least 1% by weight and at most 5% by weight. Good encapsulation results are generally achieved, for example, with 1% by weight of calcium chloride. When said liquid for the core is dropped into the alginate solution, a shell forms spontaneously around the drops entering the hydrocolloid solution. The alginate solution can comprise, for example, between 0.5 and 5% by weight of E401, preferably 1% by weight of E401 in water. Methyl cellulose and/or xanthan gum and/or locust bean gum, for example, can be added as additives or stabilizers. Even in very low concentrations, said additives have very good effects on stabilization, for example, the additives can be added in concentrations between 0.125% by weight up to 1% by weight, wherein xanthan gum and locust bean gum achieve good effects even in very low concentrations and methyl cellulose in somewhat higher concentrations.

The liquid for the core is based on the emulsion (oil and aqueous liquid, for example, water) and the nematodes to be added. For example, the nematodes can be suspended in water and added to the emulsion. The emulsion is preferably prepared with a proportion of the oil between 20% and 70% and water. The water can be tap water, but also, for example, treated water, such as ultrapure water or fully deionized water. For example, isotonic salt solutions can also be used instead of water. Various oils or liquid edible fats can be used as oils, in particular sunflower seed oil, rapeseed oil, olive oil or others. Special oils such as scented oils can also be used as the oil or as a component of the oil fraction. It is advantageous to add emulsifiers, such as sunflower lecithin, soya lecithin, propylene glycol alginate (E405), silica sol or others to stabilize the emulsion. The emulsion itself can be prepared by rapid stirring. It is particularly advantageous to use a dispersing device, for example, an ULTRA-TURRAX® (IKA-Werke GmbH & Co. KG, Germany) or similar devices.

In principle, commercially available nematode products can be used for the production of the liquid-core capsules, said products being offered, for example, with clay mineral powder as a carrier or other carrier materials. Oil-based nematode products can also be used for the liquid-core capsules according to the invention. For this purpose, the respective nematode product can, for example, be suspended in water and mixed with the previously prepared emulsion of oil and water until a homogeneous mixture is formed. Divalent ions can be added to said mixture, for example, by adding calcium chloride or calcium lactate, and said mixture is then added dropwise to the hydrocolloid solution provided. After the core liquid has been dropped into the hydrocolloid solution and after the hydrogel shells have formed around the drops, the resulting liquid-core capsules can be sieved off and rinsed with water.

The liquid-core capsules produced can be stored for a long period of time, for example, at least up to 2 months, refrigerated storage being preferred. The nematodes remain vital over a very long period of time, especially if they are stored in a cool place. Of course, the liquid-core capsules produced can also be used more or less immediately for biological pest control. Storage at room temperature over a longer period of time, for example, up to 6 weeks, is also possible.

The invention also comprises a method for controlling pests, in which the liquid-core capsules described above are applied to a plant stock. In addition, the invention comprises the use of the described liquid-core capsules for pest control. The particularly advantageous properties of the liquid-core capsules described are evident in this method of controlling pests, since the emulsion comprised in the core of these capsules enables the capsules to have a very long-term effect in controlling pests. The emulsion in the core leads to the capsules remaining stable over a long period of time due to reduced evaporation, and the emulsion also having a very positive effect on the vitality of the nematodes, so that long-term release and activity of the nematodes are also guaranteed. Overall, this leads to active nematodes emerging from the capsules over a period of several weeks, for example, up to four weeks, and being able to have a damaging effect on their respective target insects or possibly on the snails.

The liquid-core capsules are expediently introduced onto or into the plant substrate for use in pest control. The introduction can be done in different ways. In the simplest case, the liquid-core capsules are spread manually and optionally incorporated into the substrate or covered by a further layer of substrate that is spread on. For example, the liquid-core capsules can be incorporated into the top ten centimeters of the substrate layer. In general, it is advantageous if the liquid-core capsules are evenly distributed in the substrate layer. Technical means can also be used to place or apply the liquid-core capsules, for example, commonly used planting or fertilizer technology, for example, seeders, fertilizer spreaders, fertilizer lances, potting machines or substrate mixers. In a particularly advantageous embodiment of the method for controlling pests, the liquid-core capsules can also be mixed into the plant substrate in an initial treatment before the planting or sowing of the crop. This embodiment can be used with great advantage, for example, in the cultivation of herbs. Here, the nematodes are deposited in the form of the liquid-core capsules in the plant substrate. When the plants have grown after one to two weeks and the first pests appear, the entomopathogenic nematodes are already present. This is also a particular advantage of the liquid-core capsules according to the invention, since the long-term and delayed release from the liquid-core capsules over several weeks makes such a prophylactic treatment possible in the first place.

Overall, the liquid-core capsules according to the invention enable a method for controlling pests that offers considerable advantages. In particular, the number of necessary treatments is reduced with the amount of work thus being reduced. An increased degree of effectiveness and increased effect safety are achieved using the liquid-core capsules according to the invention. Particularly preferred areas of application are found in particular in the commercial cultivation of herbs and ornamental plants, for example, orchids or poinsettias. The liquid-core capsules can also be used with particular advantage in the hobby sector, in particular with potted plants. Here, the liquid-core capsules can either be applied only after an infestation has occurred or already prophylactically, for example, when the respective plants are sowed or planted, by mixing said capsules into the plant substrate. A plant substrate into which the liquid-core capsules according to the invention have already been mixed can preferably also be used for this purpose.

Preferably, between 1-1,000 liquid-core capsules/$m^2$ substrate area are used when applying the liquid-core capsules to the plant stock. Preferably, between 10-500 liquid-core capsules/$m^2$ substrate area can be used. In general, the dosage of the liquid-core capsules depends on their size and their nematode load, which, as explained above, can be adjusted accordingly by adaptations in the production process. For example, the capsules can be produced such that there are around 50 million EPN in 1 kg of capsules. Arithmetically, the average number of capsules here, depending on the loading of the individual capsules with EPN, is around 6,900 pieces/kg. There are about 7,200 EPN in each capsule on average. With a preferred application rate of 500,000 EPN/$m^2$, 10 g/$m^2$ or correspondingly 69 pieces/$m^2$ of capsules are applied.

In a particularly preferred manner, the liquid-core capsules according to the invention are provided in a packaging unit with approximately 50 million EPN. The 50 million EPN can be encapsulated in around 32,000 individual capsules and provided as a packaging unit with a wet weight of around 1.6 kg. In this case, each capsule contains around 1,500 to 1,600 EPN. Such a packaging unit is generally sufficient for the treatment of a cultivation area of around 100 m² or for around 2.5 m³ of plant substrate or for the treatment of around 5,000 plant pots having a maximum filling volume of 1 l. This dosage specification is particularly suitable for a light initial infestation or preventive treatment. Depending on the pest infestation and crop management, a different dosage, in particular an increase in dosage, can be advantageous.

An even distribution of the liquid-core capsules is advantageous when mixing the liquid-core capsules into a plant substrate. If the liquid-core capsules are placed directly on the plant substrate, it is advantageous to cover the liquid-core capsules with plant substrate, for example, with a layer thickness of at least 2 cm.

If the liquid-core capsules are to be introduced directly in a plant pot, an average of 6-7 capsules (corresponding to around 10,000 nematodes) can be used for a plant pot having a maximum filling volume of 1 l. The dosing can be made, for example, using a dosing spoon having a volume of about 1 ml.

Since the production of the liquid-core capsules allows the loading of the nematodes per capsule to be adapted, the loading of the liquid-core capsules with nematodes can be adjusted to the desired number of capsules to be released. If, for example, 3 liquid-core capsules are to be introduced into a planter (for example, 12×12×12 cm), of which there are around 70 per square meter, around 210 capsules/m² are required. With unchanged capsule weight and preferred application amount, the concentration in the capsules is 16.5 million EPN/kg or 2,400 EPN/piece.

The soil temperature when applying the liquid-core capsules according to the invention should expediently not be below 4° C. For example, the capsules of the invention can be applied with good results when the soil temperature is at least 8-12° C. On the other hand, the soil temperature should not be above 34° C.

Further features and advantages of the invention result from the following description of embodiments in connection with the drawings. The individual features here can each be implemented individually or in combination with one another.

In the drawings it is shown:

FIG. 1 Diagram of the weight loss of the liquid-core capsules (emulsion capsules) according to the invention in comparison with liquid-core capsules containing an aqueous core (water capsules) at 22° C. and 40% relative humidity;

FIG. 2 Diagram of the weight loss of the liquid-core capsules (emulsion capsules) according to the invention in comparison with liquid-core capsules containing an aqueous core (water capsules) at 25° C. and 70% relative humidity;

FIG. 3 Diagram of the weight loss of the liquid-core capsules (emulsion capsules) according to the invention in comparison with liquid-core capsules containing an aqueous core (water capsules) at 4° C. and 40% relative humidity;

FIG. 4 Vitality profile of the nematodes encapsulated according to the invention after application in a plant substrate;

FIG. 5 Comparison of the vitality of the nematodes in liquid-core capsules according to the invention (emulsion capsules) and in liquid-core capsules containing an aqueous core (water capsules) over time at 100% relative humidity;

FIG. 6 Effect of the nematodes (*Steinernema carpocapsae*) encapsulated according to the invention on mealworms as a reference organism in comparison with a watering application of the nematodes; and FIG. 7 Effect of the nematodes (*Steinernema feltiae*) encapsulated according to the invention on mealworms as a reference organism in comparison with a watering application of the nematodes.

EXAMPLARY EMBODIMENTS

Example 1: Production of the Liquid-Core Capsules

A preferred production process for the liquid-core capsules according to the invention is described in the following example. A Rotarus® multi-channel peristaltic pump having eight hoses (Hirschmann, Germany), two magnetic stirrers, stands, a dispersing device (ULTRA-TURRAX®, IKA-Werke GmbH & Co. KG, Germany), a mechanical stirrer, beakers and a sieve are provided for dripping and rinsing the capsules. Alternatively, drop formation by means of nozzles is also suitable for the production of the liquid-core capsules, in particular for the production of the liquid-core capsules on a larger scale.

In a preferred embodiment, 250 g of sunflower seed oil and 500 g of water are weighed out for the production of about 1 kg of liquid-core capsules and an emulsion is produced by means of ULTRA-TURRAX®. An emulsifier (1.2% by weight E405) is added to stabilize the emulsion. Furthermore, 3% by weight of calcium chloride is also added. A commercially available nematode product containing 50 million animals is suspended in 20 ml of water in a separate beaker. The nematode supply vessel is rinsed with 10 ml of water and both suspensions are combined. The 30 ml of the liquid having the nematodes are added to the emulsion and gently stirred in until a homogeneous mixture is formed. The vessel containing the resulting liquid for the core is attached to a stand, the eight hoses of the multi-channel pump being immersed in the liquid in this vessel.

The water used to produce the liquid for the core can be enriched with oxygen. This can have a further beneficial effect on the vitality of the nematodes. The water enriched with oxygen can be produced to make the emulsion and/or the suspension of the nematodes.

1% by weight of sodium alginate (E401) is dissolved in water to prepare the hydrocolloid solution for the shell. Additives or stabilizers are optionally added, for example, methyl cellulose. The liquid for the core (emulsion containing nematodes) is pumped by means of the peristaltic pump for the dropping process. The outlet openings or their diameter can be adjusted depending on the desired droplet size, wherein different hose variants and/or additional elements such as pipette tips can be used. The height of the hoses above the provided solution can be varied depending on the drop weight in order to obtain round capsules that are as homogeneous as possible. The drop weight can be between 10 and 90 mg, for example. The diameter of the capsules can vary from a few millimeters to a few centimeters. The capsule shell forms immediately when the liquid for the core is dropped into the provided hydrocolloid solution. The calcium in the core liquid reacts immediately with the alginate in the provided solution. This forms the shell and the shape of the drop is directly stabilized. The thickness of the shell can be adjusted depending on the ratio of calcium to alginate, optionally plus additives. The dwell time of the capsules in the provided solution after being dropped in can also be used to influence the shell thickness. The reaction ends when all free calcium ions are consumed, or the reaction is terminated by sieving the capsules and then rinsing them with water. The capsule shell can then optionally be further solidified. For solidification, the capsules can be placed in a CaCl$_2$ bath, for example, so that the hydrogel shell is saturated with calcium ions and thereby hardened. The liquid-core capsules are then ready for use or can be stored. The liquid-core capsules are expediently portioned, packaged and labeled for transport.

Figure 2:
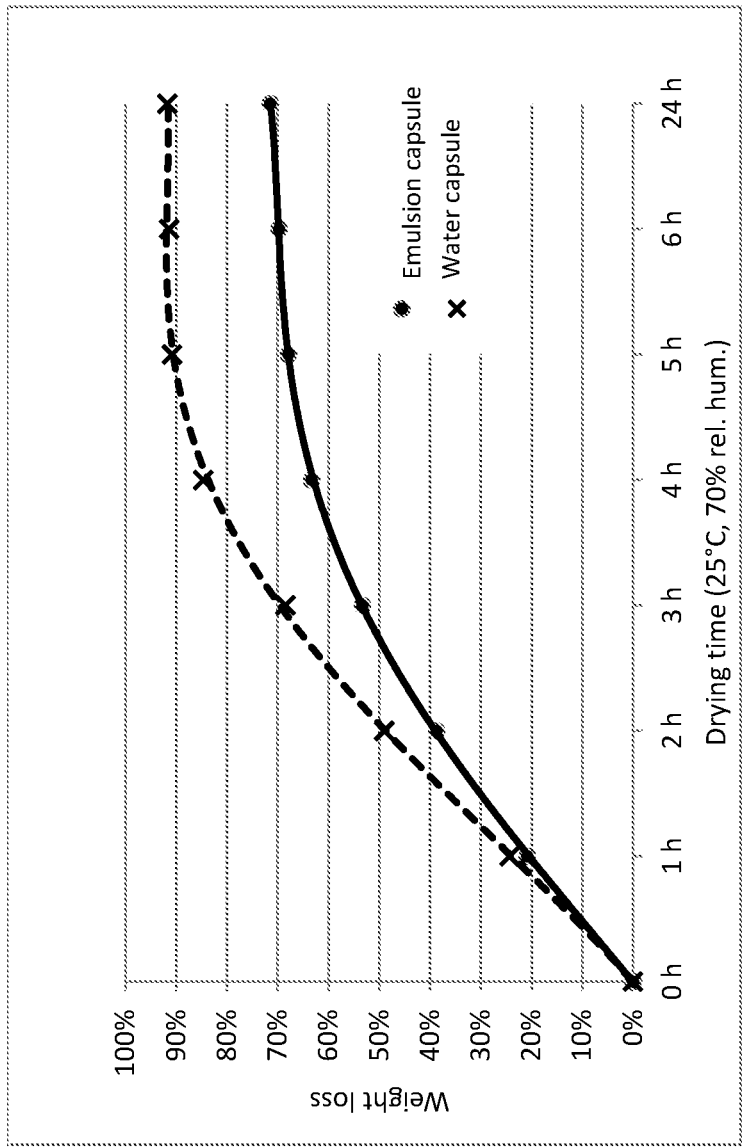
Figure 3:
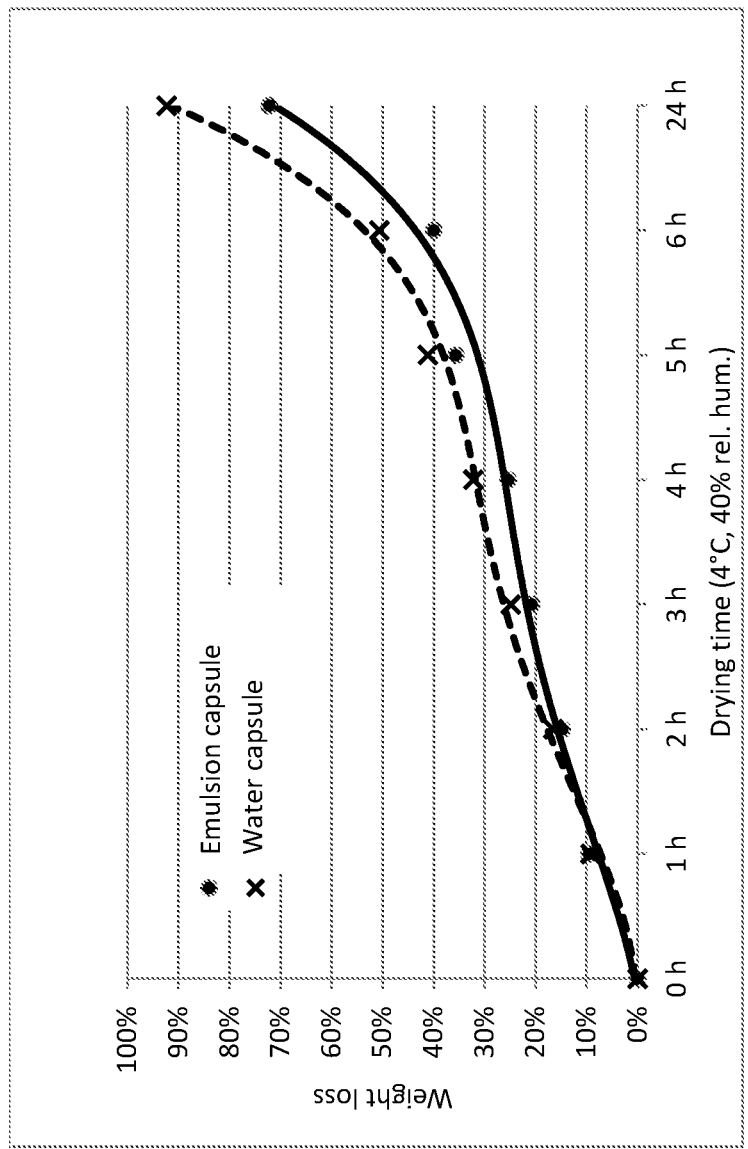

The liquid-core capsules produced in this way were examined with regard to water loss or drying out in comparison with liquid-core capsules containing an aqueous core. The aqueous core here means that apart from the nematodes, only water is contained in the core. The water loss was determined from the measured weight loss of the capsules. For these experiments, the capsules were placed in petri dishes and exposed to the respective conditions with regard to temperature and humidity. FIG. 1 shows the water loss of the liquid-core capsules at 22° C. and 40% relative humidity, FIG. 2 shows the water loss of the liquid-core capsules at 25° C. and 70% relative humidity and FIG. 3 shows the water loss of the liquid-core capsules at 4° C. and 40% relative humidity. In each case, the course of the water loss is shown for the liquid-core capsules (emulsion capsule) according to the invention and liquid-core capsules containing water in the core (water capsule). In all the conditions tested, it can be clearly seen that the drying out of the liquid-core capsules according to the invention is less than that of the liquid-core capsules containing water in the core. For example, for the water capsules at 22° C. and 40% humidity (FIG. 1), a weight loss of 80% is already achieved after 4 h. With the emulsion capsules, a weight loss of just under 80% can only be observed after 24 h. The weight loss is due to the evaporation of water from the shell and core. With the water capsules, a water or weight loss of almost 100% can be observed after 24 h. So by this point, the water capsules have, in a sense, dried up and shrunk greatly to a raisin-like shape. Even after 48 h, the emulsion capsules only show a weight loss of just under 80% and are round to oval in shape. This means that there is still a liquid portion in the emulsion capsules at this point in time, which is largely formed by the oil portion of the emulsion. The decisive factor here is that the vitality of the nematodes is still present at this point in time, as observed microscopically. The vitality of the nematodes can be traced back to the water that is still present, since said nematodes must be surrounded by at least a thin film in order to survive. However, the nematodes in the dried-out water capsules were no longer vital at this point in time. A very similar course was observed under the conditions of 25° C. and 70% humidity (FIG. 2), wherein the maximum evaporation was somewhat lower in both the water capsules and the emulsion capsules. At 4° C. (FIG. 3), the overall evaporation was significantly delayed for both capsule types.

When evaluating these test results, it should be noted that the experimental arrangement does not reflect the conditions for using the liquid-core capsules in a plant stock. In a plant stock, a certain degree of moistening of the liquid-core capsules is or should generally be ensured, so that complete evaporation of the aqueous portion should not occur. As the inventors were able to show in application experiments in plant cultures, the emulsion capsules show their effect over several weeks, in which nematodes leave continuously. Nevertheless, even under dry conditions, there would be a clear advantage of the emulsion capsules over water capsules, since the nematodes are still surrounded by a film of water by means of the water-in-oil emulsion and retain a certain level of vitality when the capsules are maximally dehydrated.

Figure 4:
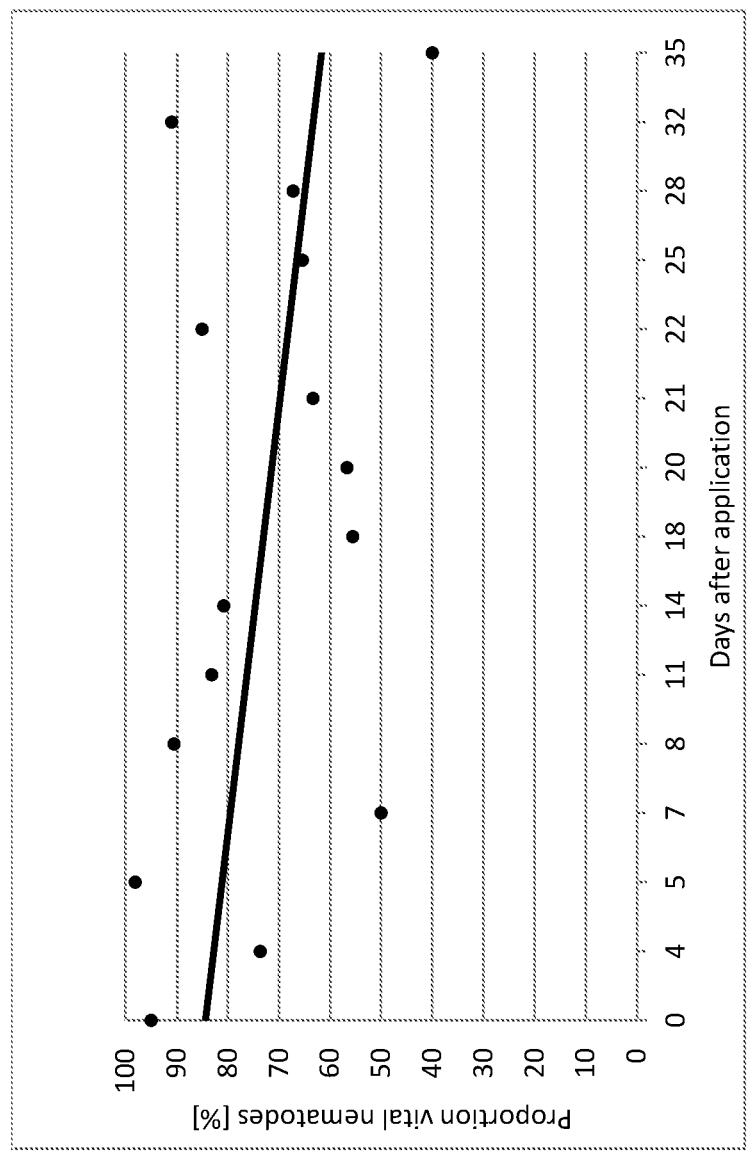

Example 2: Examination of the Course of Vitality of the Nematodes Encapsulated According to the Invention After Application in a Plant Substrate Emulsion capsules were produced with *Steinernema carpocapsae* according to Example 1 and mixed with a commercially available plant substrate (Floradur® B Seed, Floragard Vertriebs-GmbH, Germany). After this application, the plant substrate was kept permanently moist at 25° C. and the vitality of the nematodes was observed for 35 days. For each time point examined, 4 Petri dishes, to which 3 capsules had been added in each case, were set up with substrate. The evaluation was carried out microscopically by examining the substrate, wherein the ratio of the vital nematodes to the recognizable nematodes was determined overall. The measuring points in FIG. 4 represent mean values of the 4 shells considered in each case. The line represents a regression line. On average, the investigation shows a certain decrease in the vitality of the nematodes over a period of 35 days, the vitality dropping from around 85% at the beginning to around 60% after 35 days. Nevertheless, even after 35 days, a significant proportion of vital nematodes are still present in the emulsion capsules.

Figure 5:
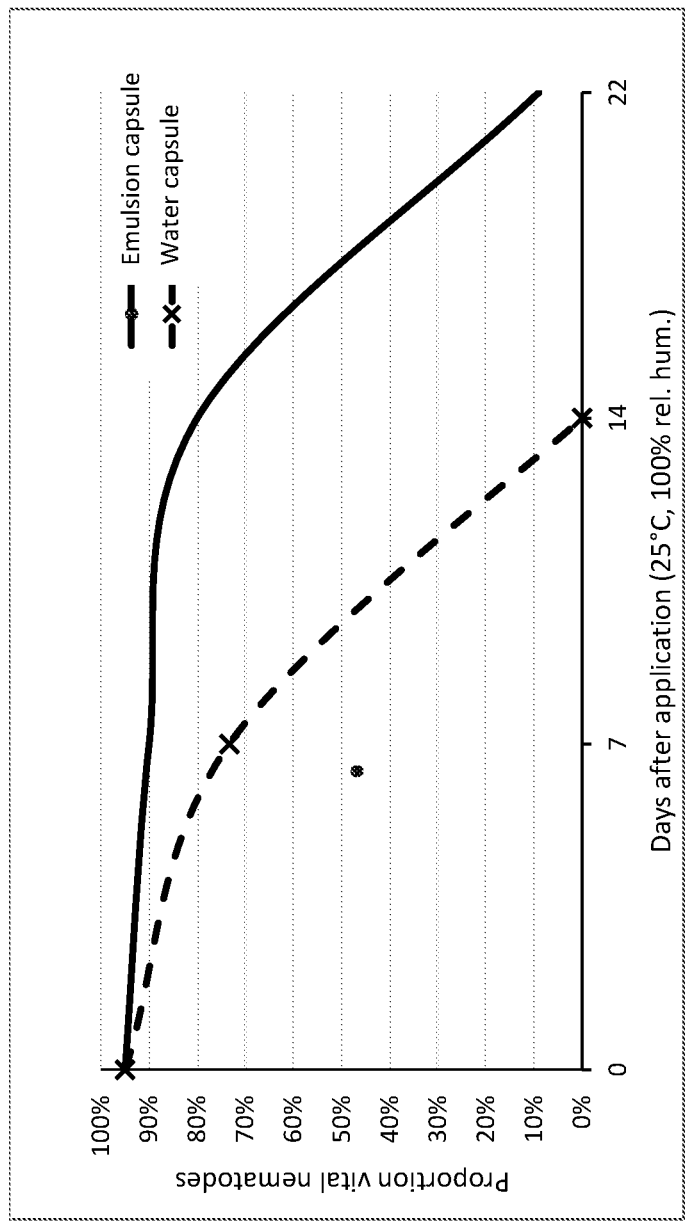

Example 3: Comparative Examination of the Vitality of the Nematodes in Liquid-Core Capsules (Emulsion Capsules) According to the Invention and in Liquid-Core Capsules Containing an Aqueous Core (Water Capsules) Over Time at 100% Relative Humidity Nematodes (*Steinernema carpocapsae*) (emulsion capsules) encapsulated according to the invention according to Example 1 and capsules having an exclusively aqueous core (water capsules) produced in a comparable manner were observed in Petri dishes (d=90 mm) at 25° C. and about 100% relative humidity over a period of 22 days. The proportion of vital nematodes compared to the total proportion of nematodes was determined microscopically after 7 days, 14 days and 22 days. The results are shown in FIG. 5. Under the conditions set here (100% relative humidity), the capsules do not dry out significantly. Nevertheless, a clear difference in the vitality of the nematodes can be determined after just 7 days. While a vitality of about 90% can be observed in the emulsion capsules, only 70% of the nematodes are vital in the water capsules. After 14 days, the vitality of the nematodes in the water capsules has dropped to 0%. The vitality of the nematodes in the emulsion capsules is still 80% at this point in time, but then drops to 10% by day 22. These results show that the oil content itself in the liquid-core capsules according to the invention exerts a positive effect on the vitality of the nematodes, regardless of its positive influence on drying out.

Example 4: Examination of the Effect of the Nematodes Encapsulated According to the Invention (*Steinernema carpocapsae, Steinernema feltiae, Heterorhabditis bacteriophora*) on Mealworms as a Reference Organism in Comparison with a Watering Application of the Nematodes An experiment was carried out to investigate the effect of the nematodes encapsulated according to the invention (*Steinernema carpocapsae*) in comparison with a watering application of the nematodes. The effect on mealworms was examined for this purpose. Mealworms (larvae of the flour beetle *Tenebrio molitor*) are an established reference organism for analyzing the effects of entomopathogenic nematodes (EPN). For the experimental arrangement, 1 l of plant substrate (Floradur® B Seed, Floragard Vertriebs-GmbH, Germany) was loosely poured into rectangular trays 170× 130×120 mm (L×W×H). 55,000 EPN in liquid were poured onto the substrate for the liquid application (positive control). The liquid used for this test was the emulsion which represented the core solution in the production of the liquid-core capsules according to the invention. As the negative control the substrate was not treated further. For the application of the nematodes encapsulated according to the invention, an average of 12 capsules having a total of 55,000 EPN, which had been produced according to Example 1, were mixed into the substrate. 40 mealworms were then placed on the substrate. Because the non-encapsulated core solution, so to speak, was used for the suspension of the nematodes in the positive control, the approach using the watering application and the approach using the nematode capsules according to the invention differs solely in the capsule form of the nematode preparation. The experimental arrangement was observed over a period of 6 weeks, all mealworms being removed weekly and replaced with new mealworms (40 mealworms per batch). The nematodes were applied only once at point in time zero.

Figure 6:
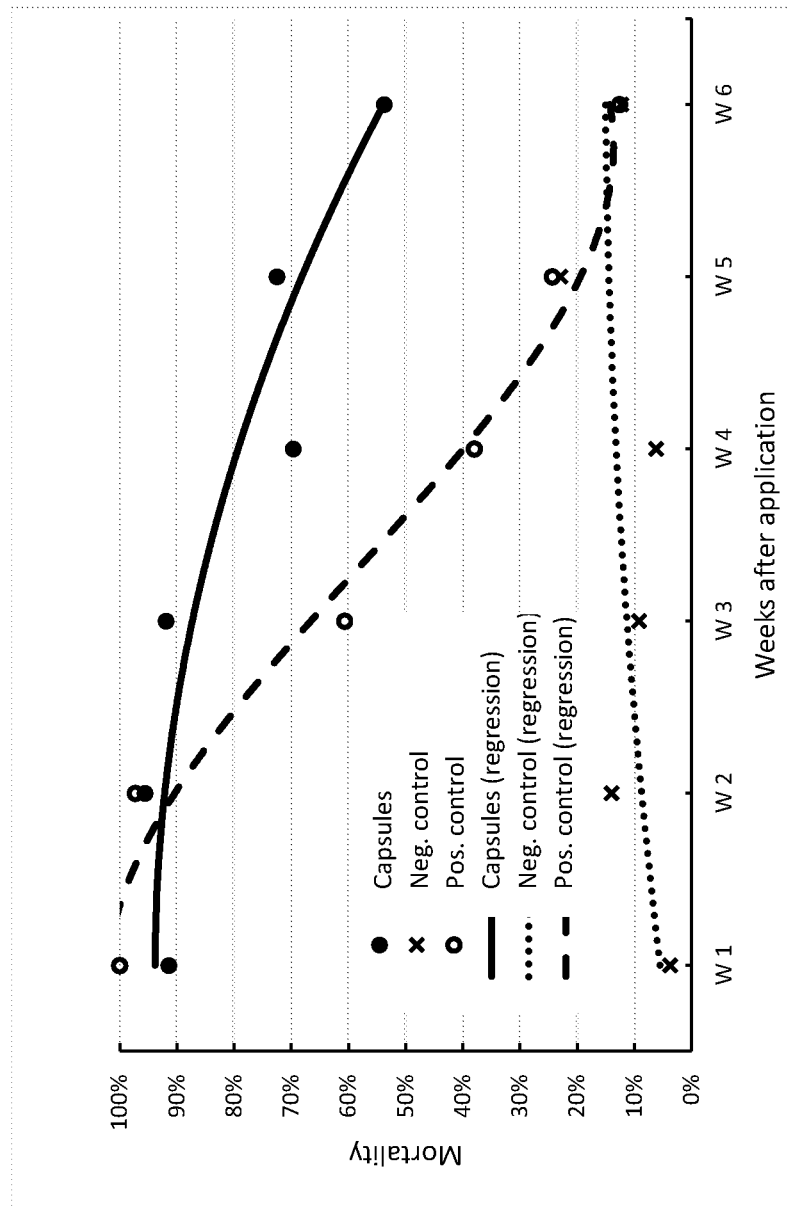

FIG. 6 shows the experimental results, wherein the individual measurement points represent the average mortality of the mealworms in percent (degree of effectiveness). The lines represent polynomial regressions. The sample size for the negative control was n=53, for the positive control n=33 and for the approach using the nematodes encapsulated according to the invention n=39. This means that a total of 53 experimental batches were evaluated for the negative control, a total of 33 experimental batches were evaluated for the positive control and a total of 39 experimental batches were evaluated for the approach using the nematodes encapsulated according to the invention. In weeks 1 and 2 (W 1 and W 2), after the application of the EPN, there was still no difference between the watering application (positive control) and the application of the liquid-core capsules according to the invention. In week 3 (W 3), however, only 60% mortality of the mealworms can be observed in the watering application, whereas the mortality of the mealworms in the liquid-core capsules according to the invention is still in the range of 90%. In the following weeks, the effect of the nematodes from the watering application on the mealworms decreases significantly and by week 6 (W 6), it falls to only 10%, which corresponds to the negative control without any application of nematodes. The effect of the liquid-core capsules according to the invention at time W 6, on the other hand, is still present with a mortality of about 55%. Overall, therefore, the application of the EPN in the form of the liquid-core capsules according to the invention is clearly superior to a watering application.

Emulsion capsules having *Steinernema feltiae* and *Heterorhabditis bacteriophora* were produced in a corresponding manner according to Example 1 and the effect of the emulsion capsules on the mortality of mealworms as a reference organism was examined according to the experimental approach described above.

Figure 7:
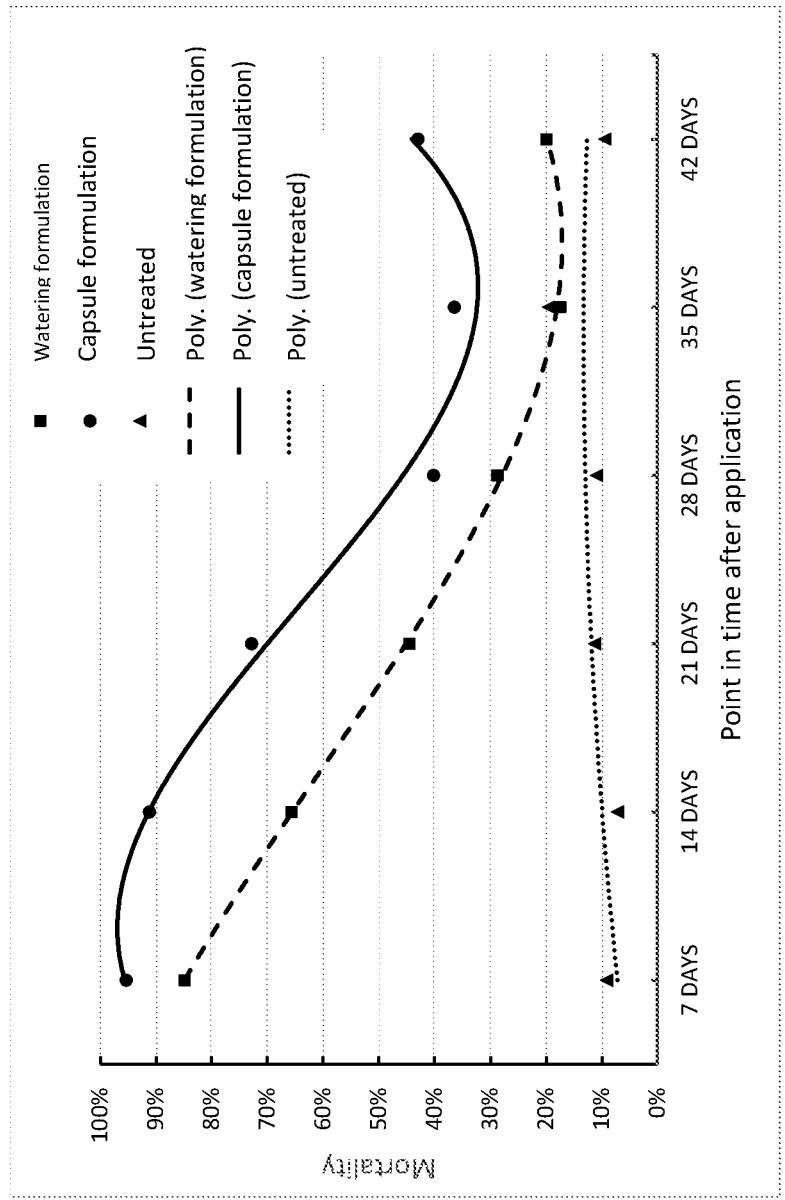

FIG. 7 shows the experimental results with *Steinernema feltiae*, the individual measurement points representing the mean mortality of the mealworms in percent (degree of efficiency). Liquid-core capsules having *Steinernema feltiae* were examined in comparison to an untreated variant (negative control) and a variant applied as a watering formulation (positive control). Test conditions: 40 mealworms, 1 liter substrate, 200 cm² area, 2 liter vessel, 25° C. A summary of 47 test series in three repetitions is shown. The filled circles represent the mean mortality after application of 20 capsules with a total of approximately 31,000 EPN. The filled rectangles represent the mean mortality after application of approximately 31,000 EPN in liquid (watering formulation). The filled triangles represent the mean mortality without application of EPN. The lines show the polynomial regressions of the respective measurement points.

It was also shown here (comparable to FIG. 6) that the application of the EPN in the form of the liquid-core capsules according to the invention is clearly superior to a watering application.

Liquid-core capsules according to the invention were also produced according to Example 1 using *Heterorhabditis bacteriophora* and examined with regard to their effect on mealworms (data not shown). In the first experiments, the effect of the liquid-core capsules was at least comparable to the watering application of the nematodes, so that the results show that *Heterorhabditis bacteriophora* can also be applied effectively in the form of the liquid-core capsules according to the invention and the special advantages of the liquid-core capsules according to the invention can thus be used, for example, with regard to shelf life and with regard to the special advantages during application in comparison with the conventional watering application.

Example 5: Application of Liquid-Core Capsules in Plant Culture

For the following application examples, capsules are provided with an average nematode density of around 2,400 animals (*Steinernema carpocapsae* or *Steinernema feltiae*) per liquid-core capsule. This corresponds to around 16.5 million EPN/kg capsules.

For the first application, plant pots measuring 12×12×12 cm (for example, Göttinger square container) are filled with plant substrate (for example, "Floradur® B Seed" from Floragard) to a height of about 8 cm. The seedlings (for example, young cucumber plants) are placed therein or, alternatively, seeds of plants to be cultivated (for example, parsley) are spread on. Three liquid-core capsules are spread onto the substrate surface and the pots are then covered with a further substrate layer of about 2 cm. In principle, all conceivable methods, with which the liquid-core capsules can be worked into the substrate manually or mechanically in a comparable manner, can be used. In commercial plant production, the liquid-core capsules are particularly preferably incorporated into the substrate by machine. For example, the capsules can be injected into the substrate using fertilizer lances. This method is preferably suitable for application in individual vessels. The capsules can be spread onto the substrate and then covered with a further layer of substrate by means of so-called potting machines or sowing devices.

After application, the substrate is watered with sufficient water so that it is evenly moistened. Further plant cultivation takes place in the usual way, according to the required plant-specific conditions. In particular, prolonged dry phases in the substrate should be avoided over the entire cultivation period.

For a cultivation period of more than 4 weeks and a persistent pest infestation, follow-up treatment is preferably carried out at four-week intervals. About three capsules are spread on a plant pot and gently worked into the substrate with a small rod or a spoon, for example, so that the capsules are covered by about 1 to 2 cm of substrate. Alternatively, a planting stick can press a hole in the substrate, for example. The liquid-core capsules are then inserted and the holes closed again with some substrate.

The liquid-core capsules can also be used in the same way with all known organic or artificial plant substrates, substitutes (for example, expanded clay, vermiculite, perlite, rock wool, foam materials) or any customary mixtures of different substrates and substitutes.

Example 6: Application of the Liquid-Core Capsules in Foam Elements for Plant Culture For these application examples, capsules with an average nematode density (*Steinernema carpocapsae* or *Steinernema feltiae*) of approximately 2,400 animals per liquid-core capsule are provided. This corresponds to around 16.5 million EPN/kg capsules.

When cultivating plants (for example, orchids) in cylindrical foam elements (for example, diameter 7 cm), the foam elements are cut vertically up to about the central axis. A shoot section is inserted into the resulting notch together with 1 to 2 capsules. The foam element is then slightly compressed and placed in a suitable vessel (for example, round pots, diameter 6 cm), which prevents it from expanding again and thus provides the shoot with sufficient support.

After application, the foam element is watered with sufficient water so that it is evenly moistened. Further plant cultivation takes place in the usual way, according to the required plant-specific conditions. In particular, prolonged dry phases in the substrate should be avoided over the entire cultivation period.

For a cultivation period of more than 4 weeks and a persistent pest infestation, follow-up treatment is preferably carried out at four-week intervals. To do this, the foam elements are removed from the planter, two liquid-core capsules are inserted into the notch, slightly pressed together and placed back into the planter.

Example 7: Application of the Liquid-Core Capsules in the Production of Substrate for Plant Culture For this application example, capsules with an average nematode density (*Steinernema carpocapsae* or *Steinernema feltiae*) of approximately 7,200 animals per liquid-core capsule are provided. This corresponds to around 50 million EPN/kg capsules.

During the production of substrate (for example, "Floradur® Pot Cyclamen/Poinsettia" from Floragard), in which the different components are mixed (white peat, black peat, water, carbonated lime, fertilizer, wetting agent), approximately 100 g capsules per $m^3$ of substrate are introduced into the mixing process. The final mixture is preferably delivered from the substrate manufacturer to the user within a week. Users are, for example, companies that produce ornamental plants. The type of delivery takes place in the conventional manner as bagged goods or as loose goods. The user processes the substrate in the usual way, preferably within 2 weeks, for example, for repotting cyclamen, potted roses, poinsettias or hydrangeas in plant pots 12×12×12 cm. After processing, there is an average of 7,200 EPN in a pot, partly present in the capsule and partly already distributed in the substrate.

Example 8: Application of the Liquid-Core Capsules to Control Snails

Capsules containing nematodes of the species *Phasmarhabditis hermaphrodita* with a density of preferably about 1,000 animals per liquid-core capsule are provided. This corresponds to around 7 million EPN/kg capsules. The amount is sufficient to treat about 100 $m^2$ of cultivated area.

Ideally, the application should take place at a time when snails are more common, for example, in warm, humid weather and little sunlight. For application, the liquid-core capsules are spread on the soil of the culture area to be treated. This can be done by hand in the simplest case and for small areas. Suitable technical means, for example, commercially available fertilizer or seed spreaders, can be used for larger areas. The liquid-core capsules are preferably applied where increased snail movements are to be expected, thus, for example, around the crops (for example, lettuce), between the rows of plants, on the edges of the crop area and on the edges of neighboring areas that are attractive for snails, into which the snails often retreat during the day and when it is dry. The culture area is kept moist after application.

For a cultivation period of more than 3 weeks and a persistent snail infestation, follow-up treatment is preferably carried out at three-week intervals. The follow-up treatment is carried out in the same way as previously described.

Example 9: Use of *Steinernema feltiae* in the Form of Liquid-Core Capsules for Controlling the Larvae of Fungus Gnats in the Home and Garden or in Commercial Horticulture Liquid core capsules containing the nematodes *Steinernema feltiae* were produced in principle according to Example 1, the material composition of the liquid-core capsules shown in the table below having been set:

| Designation | E number | Weight percentage of total mass [%] |
| --- | --- | --- |
| Desalinated tap water | — | 72.8 |
| Sunflower oil | — | 22.1 |
| Nematodes (product nemaplus ®, e-nema GmbH, Germany) | — | 3.7 |
| Calcium chloride | E509 | <1 |
| Propylene glycol alginate (dissolved) | E405 | <1 |
| Sodium alginate (natural substance) | E401 | <1 |

Packaging units containing 50 million nematodes were provided for use in commercial horticulture, for example. Each packaging unit comprised about 32,000 individual capsules with a total weight (wet weight) of about 1.6 kg, said weight having been subject to certain fluctuations due to different amounts of water adhesion. The capsule size had an average diameter of 4-5 mm and the pouring properties of the capsules showed good flowability.

The primary packaging was in foil bags or vessels made of plastic which were provided with small holes on one side for oxygen supply to the nematodes. The filling level of the liquid-core capsules was between 5 and 10 cm.

Dark and cool storage (4-10° C.) was suitable as storage conditions. The shelf life was at least 2 months. During storage, regular mixing of the capsules, for example, by turning the vessels or bags several times, is recommended in order to optimize the oxygen supply to the nematodes. It was recommended not to cover the perforated areas of the packaging for longer periods and to let the water that emerged from the packaging drain off.

The capsules were introduced in the plant substrate or in the seed hole when the seeds were sown or seedlings were planted. With substrate mixtures, about 50 million nematodes were used for 2.5 m$^3$ of substrate and were evenly distributed in the substrate. Alternatively, capsules were placed directly in the plant pot, for example, in the seed hole, wherein an average of 6-7 capsules, that is, around 10,000 nematodes per pot, were used per plant pot with a maximum filling volume of 1 l. Alternatively, the capsules were applied to the plant substrate and covered with at least 2 cm of substrate. The plant substrate was kept culture-moist during use.

These amounts were used for a light initial infestation or preventative treatment.

After introducing the capsules in the plant substrate, the shell of the capsules became permeable after about 1 week and the nematodes gradually migrated. Over a period of several weeks, more and more new nematodes got into the substrate and were able to effectively control fungus gnats the first time they appeared. In comparison to the application of nematodes by watering application, the treatment with the capsules had an almost doubled duration of action and could therefore also have a preventive effect against the larvae of the fungus gnat. The duration of action was about 6 weeks, the highest effectiveness observed between the 2nd and 4th week after application.

The invention claimed is:

1. A liquid-core capsule for pest control, wherein the liquid-core capsule has a liquid core comprising an emulsion of water and at least 10% (w/w) vegetable oil, and entomopathogenic nematodes, and a surrounding alginate hydrogel shell.

2. The liquid-core capsule according to claim 1, wherein the vegetable oil is sunflower seed oil and/or rapeseed oil and/or olive oil.

3. The liquid-core capsule according to claim 1, wherein the proportion of oil in the emulsion is at most 70% (w/w).

4. The liquid-core capsule according to claim 1, wherein the surrounding alginate hydrogel shell is a calcium alginate shell.

5. The liquid-core capsule according to claim 1, wherein the surrounding alginate hydrogel shell comprises at least one additive and/or at least one thickener.

6. A plurality of liquid-core capsules, wherein each liquid-core capsule of the plurality of liquid-core capsules is a liquid-core capsule according to claim 1, and wherein the liquid-core capsules comprise an average of 1,000 to 15,000 nematodes per liquid-core capsule.

7. The plurality of liquid-core capsules according to claim 6, wherein the liquid-core capsules have an average diameter of between 1 to 30 mm.

8. The plurality of liquid-core capsules according to claim 6, wherein the liquid-core capsules have an average weight per liquid-core capsule of between 10 to 100 mg.

9. The liquid-core capsule according to claim 1, further comprising at least one attractant for the pests to be controlled.

10. The liquid-core capsule according to claim 1, wherein the nematodes are representatives of the species *Steinernema carpocapsae* and/or *Steinernema feltiae* and/or *Steinernema kraussei* and/or *Heterorhabditis bacteriophora* and/or *Heterorhabditis downesi* and/or *Phasmarhabditis hermaphrodita*.

11. A plant substrate, wherein the liquid-core capsule according to claim 1 has been added thereto.

12. A method for the production of the liquid-core capsule according to claim 1, wherein the surrounding alginate hydrogel capsule shell is formed by dropping the emulsion of water and at least 10% (w/w) vegetable oil, and entomopathogenic nematodes into a hydrocolloid solution comprising alginate in the presence of divalent ions.

13. The method according to claim 12, wherein the emulsion is stabilized at least for the period of the dropping-in process by the use of emulsifiers.

14. A method for controlling pests, wherein a plurality of liquid-core capsules, each liquid-core capsule of the plurality of liquid-core capsules being a liquid-core capsule according to claim 1, are applied to a plant stock.

15. The method according to claim 14, wherein the plurality of liquid-core capsules are used in a dosage of between 1 to 1,000 liquid-core capsules, per m$^2$ of substrate area.

* * * * *